United States Patent Office 3,576,905
Patented Apr. 27, 1971

3,576,905
ARC RESISTANT SILOXANE VULCANIZABLE AT ROOM TEMPERATURE
Robert L. McKellar, Midland, and Ronald C. Howden, Williams Township, Bay County, Mich., assignors to Dow Corning Corporation, Midland, Mich.
No Drawing. Filed Dec. 1, 1969, Ser. No. 881,288
Int. Cl. C08g 47/02
U.S. Cl. 260—825
8 Claims

ABSTRACT OF THE DISCLOSURE

A room temperature vulcanizable ketoxime siloxane block copolymer of a polydiorganosiloxane block and a monoorganosiloxane block being endblocked with monoorganoketoximesiloxane units is useful as an arc resistant material.

---

This invention relates to a room temperature vulcanizable organosiloxane composition which is a block copolymer.

Ketoxime functional silanes and siloxanes are known in the art. The ketoxime silanes are known as being useful in crosslinking polymers in the production of room temperature vulcanizable silicone rubber. Ketoxime siloxanes are known particularly as room temperature vulcanizable silicone rubber. Ketoxime silanes and siloxanes are further described in United States Letters Patents No. 3,184,427 and No. 3,189,576 which are hereby incorporated by reference.

It is quite unexpected that a ketoxime siloxane would cure to provide a strong resinous material with high arc resistance compared to other silicone compositions which cure at room temperature. It is therefore an object of this invention to provide a ketoxime siloxane vulcanizable at room temperature to a high arc resistant product.

This invention relates to a room temperature vulcanizable composition stable in the absence of moisture and curable upon exposure to moisture consisting essentially of a ketoxime functional organosiloxane block copolymer consisting essentially of (A) 5 to 84 inclusive mol percent of diorganosiloxane units wherein the diorganosiloxane units are bonded through silicon-oxygen-silicon bonds forming a polydiorganosiloxane block having an average of from 6 to 350 inclusive diorganosiloxane units per block, said polydiorganosiloxane being at least 80 mol percent dimethylsiloxane units based on the total number of siloxane units in the polydiorganosiloxane and any remaining units being selected from the group consisting of phenylmethylsiloxane units and monomethylsiloxane units, (B) 11 to 75 inclusive mol percent organosiloxane units having an average formula $$R_xSiO_{\frac{4-x}{2}}$$

where $x$ has a value of from 1 to 1.3 inclusive and R is an organic group selected from the group consisting of aryl radicals, vinyl radicals, methyl radicals, ethyl radical and propyl radicals, said organic groups being at least 50 percent aryl radicals based on the total number of organic groups in (B), said organosiloxane units comprise a block of at least 3 organosiloxane units and said organosiloxane units being selected from monoorganosiloxane units and diorganosiloxane units, and (C) 2 to 27 inclusive mol percent of endblocking ketoxime siloxane units of the formula $$R'Si(O-N=X)_yO_{\frac{3-y}{2}}$$

where $y$ has an average value of from 1.8 to 2 inclusive, R' is an organic radical selected from the group consisting of alkyl radicals having from 1 to 5 inclusive carbon atoms, phenyl radicals and vinyl radicals and X is selected from the group consisting of radicals of the formula

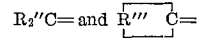

in which each R is selected from the group consisting of divalent hydrocarbon radicals and each R'' is a radical selected independently from the group consisting of monovalent hydrocarbon radicals and halogenated monovalent hydrocarbon radicals, the mol percentages of (A), (B) and (C) being based on the total number of siloxane units in the organosiloxane block copolymer.

The room temperature vulcanizable composition of the present invention can be prepared by several methods. The best method is to couple a hydroxyl terminated polydiorganosiloxane with an aromatic containing organosiloxane resin having hydroxyl groups by reaction with a trifunctional organosilane. The resulting block copolymer is hydroxylated and this block copolymer is then reacted with monoorganotriketoxime silane to yield the room temperature vulcanizable composition. Alternatively the hydroxyl terminated polydiorganosiloxane can be cohydrolyzed with a trifunctional organosilane in the proper proportions. In the methods for making the room temperature vulcanizable composition of the present invention, conditions which cause siloxane bond rearrangement should be avoided.

The preparations of the room temperature vulcanizable compositions of the present invention begin with a polydiorganosiloxane which is terminated by hydroxyl radicals or hydrolyzable groups. The polydiorganosiloxanes suitable for the present invention have an average of from 6 to 350 diorganosiloxane units per molecule, preferably from 25 to 100 diorganosiloxane units per molecule. The polydiorganosiloxanes are at least 80 mol percent dimethylsiloxane units. Any remaining siloxane units can be phenylmethylsiloxane units or monomethylsiloxane units. The polydiorganosiloxanes preferably are all dimethylsiloxane units. The phenylmethylsiloxane units or the monomethylsiloxane units are each present in amounts of 10 mol percent or less. Preferably, the monomethylsiloxane is absent or present in small amounts, such as less than 2 mol percent. The terminating groups for the polydiorganosiloxanes can be hydroxyl radicals or any hydrolyzable group. Examples of hydrolyzable groups include halogen such as chlorine, alkoxy such as methoxy, and ethoxy, acyloxy such as acetoxy, ketoxime such as methylethylketoxime and the like.

The polydiorganosiloxanes are employed in the preparation to provide the final room temperature vulcanizable composition with from 5 to 84 mol percent diorganosiloxane units derived from the polydiorganosiloxane, preferably from 60 to 80 mol percent. The mol percent of diorganosiloxane units includes any quantity of monomethylsiloxane units or phenylmethylsiloxane units in the polydiorganosiloxane. The polydiorganosiloxane forms one of the blocks of the block copolymer of the present invention. Since siloxane bond rearrangement conditions are avoided in the preparation of the room temperature vulcanizable composition of the present invention, the polydiorganosiloxanes essentially retain their original composition except for the terminating functional groups, as illustrated by the hydroxyl radicals and hydrolyzable groups. The polydiorganosiloxanes are well known in the art and can be obtained commercially.

The other block of the block copolymer of the present invention can be represented by an average unit formula $$R_xSiO_{\frac{4-x}{2}}$$

where R is an aryl radical, methyl, ethyl, vinyl or propyl and $x$ has an average value of from 1 to 1.3. Any aryl radical is suitable for the present invention and include, for example, such species as phenyl, tolyl, xylyl, xenyl, naphthyl and anthracyl. The organic radicals which are represented in the formula by R are at least 50 percent aryl and preferably at least 80 percent of the organic radicals are aryl. The organosiloxane units of (B) can all be the same, aryl, or can be mixtures of various organosiloxane units, however, the organosiloxane units are monoorganosiloxane units or diorganosiloxane units. Illustrative examples of the organosiloxane units in (B) are monoorganosiloxane units such as, phenylsiloxane, tolylsiloxane, xylylsiloxane, xenylsiloxane, naphthylsiloxane, methylsiloxane, vinylsiloxane, ethylsiloxane and propylsiloxane and diorganosiloxane units such as dimethylsiloxane, diethylsiloxane, methylvinylsiloxane, diphenylsiloxane, dinaphthylsiloxane, methylphenylsiloxane, methylethylsiloxane, methylpropylsiloxane, methyltolylsiloxane, methylnaphthylsiloxane, ethylphenylsiloxane, propyltolylsiloxane, ethylpropylsiloxane and methylxenylsiloxane. Small amounts of other siloxane units, such as triorganosiloxane units and $SiO_2$ units, as well as, monoorganosiloxane units and diorganosiloxane units with other organic groups can be tolerated up to amounts of 1 or 2 mol percent without departing from the present invention.

The organosiloxane units of block (B) are present in amounts sufficient to provide the room temperature vulcanizable composition of the present invention with from 11 to 75 mol percent organosiloxane units, preferably from 14 to 26 mol percent.

Block (B) consists of at least 3 organosiloxane units per block. The average size of polymer block (B) is dependent upon the method of preparation and also dependent upon the average size of the polydiorganosiloxane blocks of (A) and the mol percentage of organosiloxane units of (B).

The endblocking ketoxime siloxane units of (C) are represented by the average unit formula $$R'Si(O-N=X)_y O_{\frac{3-y}{2}}$$

where $y$ has an average value from 1.8 to 2 inclusive, R' is an organic radical selected from the group consisting of alkyl radicals having from 1 to 5 inclusive carbon atoms, phenyl radicals and vinyl radicals and X is selected from the group consisting of radicals of the formula

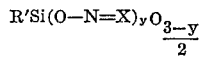

in in which each R''' is selected from the group consisting of divalent hydrocarbon radicals and halogenated divalent hydrocarbon radicals and each R'' is a radical selected independently from the group consisting of monovalent hydrocarbon radicals and halogenated monovalent hydrocarbon radicals. The alkyl radicals of R' include methyl, ethyl, propyl, isopropyl, butyl and pentyl. R'' can be any monovalent hydrocarbon radical or any halogenated monovalent hydrocarbon radical. More specifically R'' can be, for example, any alkyl radical such as methyl, ethyl, isopropyl, and octadecyl; any alkenyl radical such as vinyl and decenyl; any cycloalkyl radical such as cyclohexyl radicals; any cycloalkenyl radical such as cyclopentyl; any aryl radical such as phenyl and naphthyl radicals; any aralkyl radical such as benzyl and any alkaryl radical such as tolyl. Any of the monovalent hydrocarbon radicals can be halogenated to give radicals such as, chloromethyl, 3,3,3-trifluoropropyl, perchlorophenyl and 2,4-dibromobenzyl radicals all of which are operative.

R''' can be any divalent hydrocarbon radical or divalent halogenated hydrocarbon radical in which the two valences are attached to the C or the C=NO— group. R''' can be for example, $-CH_2(CH_2)_3CH_2-$, $-CH_2(CH_2)_4CH_2-$

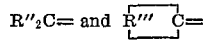

$-CH_2CH-CHCH_2CH_2-$
  | |
  $CH_3$ $CH_3$ and $-CF_2(CF_2)_2CF_2-$. Additional examples of R'' and R''' can be found in U.S. Pats. No. 3,184,427 and No. 3,189,576 which are incorporated by reference.

The endblocking ketoxime siloxane units can be illustrated by

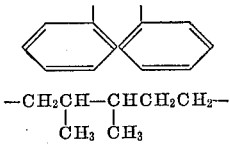

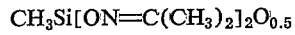

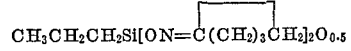

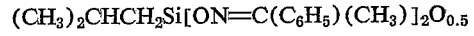

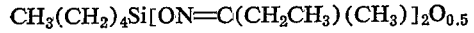

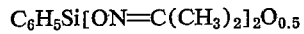

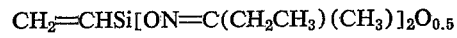

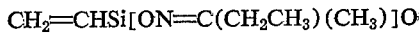

and

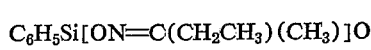

The endblocking ketoxime siloxane units are essentially all monoorganodiketoximesiloxane units with the exception that some of the endblocking ketoxime silanes used in the preparation can react with, for example, two hydroxyl radicals and thus small amounts of monoorgano monoketoxime siloxane units can be present. The endblocking ketoxime siloxane units are present in amounts sufficient to provide the room temperature vulcanizable composition with from 2 to 27 inclusive mol percent based on the total number of siloxane units in the organosiloxane block copolymer. Preferably from 2 to 18 inclusive mol percent of the endblocking ketoxime siloxane units are present.

In the preparation of the room temperature vulcanizable composition of the present invention a block copolymer is first prepared consisting essentially if the blocks described in (A) and (B). There are a number of methods known for the preparation of the block copolymer described by (A) and (B). The best method for preparing the block copolymer is to react, under anhydrous conditions a hydroxyl terminated polydiorganosiloxane with a trifunctional silane such as, methyltriacetoxysilane, phenyltriacetoxysilane, vinyltriacetoxysilane, methyltri(methylethylketoxime) silane, vinyltri(methylethylketoxime)silane, phenyltrimethoxysilane, methyltriethoxysilane and the like. Sufficient trifunctional silane is added to provide one mole of silane per mole of hydroxyl of the polydimethylsiloxane. The reaction product is a monoorganodifunctionalsiloxy endblocked polydiorganosiloxane. The monoorganodiketoxime siloxy endblocked polydiorganosiloxanes are further described in U.S. Pat. No. 3,184,427 and U.S. Pat. No. 3,189,576 which are hereby incorporated by reference. The monoorganodiacetoxysiloxy endblocked polydiorganosiloxanes are further described in U.S. Pat. No. 3,035,016 which is hereby incorporated by reference. The monoorganodialkoxysiloxy endblocked polydiorganosiloxanes are further described in U.S. Pat. No. 3,161,614 and U.S. Pat. No. 3,170,894 which are hereby incorporated by reference.

The monoorganodifunctionalsiloxy endblocked polydiorganosiloxane is then coupled to a hydroxylated organosiloxane which falls within the scope defined in (B). The coupling can take place in the presence of suitable catalyst for such reactions as described in the patents cited above. The resulting product is a hydroxylated organosiloxane block copolymer having from 0.5 to 5 inclusive weight percent hydroxyl radicals, preferably from 1 to 4.5 inclusive weight percent hydroxyl radical.

The hydroxylated organosiloxane block copolymer is then endblocked with monoorganotriketoxime silanes, R′Si(ON=CX)$_3$, where R′ and X are defined above. The monoorganotriketoxime silanes include, for example, $$CH_3Si[ON=C(CH_3)_2]_3$$

$$CH_3Si[ON=C(CH_2CH_3)(CH_3)]_3$$

$$C_6H_5Si[ON=C(CH_3)_2]_3$$

$$CH_2=CHSi[ON=(CH_2CH_3)_3]_3$$

$$CH_3CH_2Si[ON=C(C_6H_5)(CH_3)]_3$$

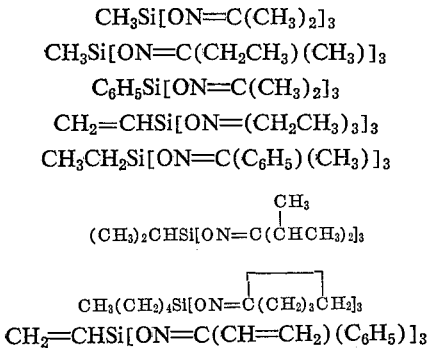

$$(CH_3)_2CHSi[ON=C(\overset{CH_3}{\underset{|}{C}}HCH_3)_2]_3$$

$$CH_3(CH_2)_4Si[ON=\overset{\longleftarrow\longrightarrow}{C(CH_2)_3CH_2}]_3$$

$$CH_2=CHSi[ON=C(CH=CH_2)(C_6H_5)]_3$$

and others as described in U.S. Pat. No. 3,189,576. Mixtures of two or more monoorganotriketoxime silanes can be used. This final step should be carried out under anhydrous conditions. The resulting product is the room temperature vulcanizable composition of the present invention.

In any of the processes described above the reactions are preferably carried out in the presence of organic solvents and at temperatures ranging from below room temperature to the boiling point of the mixture. The reactions are carried out at temperatures from −30° to 130° C., preferably from 20° to 50° C. The preparative steps described above are carried out under essentially anhydrous conditions unless otherwise stated, such as hydrolysis steps. Any of the products containing hydrolyzable groups, such as the ketoxime groups, can be stored for extended periods of time under anhydrous conditions without any appreciable change in composition or properties both in the cured and uncured state.

The room temperature vulcanizable compositions can be prepared by reacting under anhydrous conditions a hydroxylated organosiloxane block copolymer within the limits set forth in (A) and (B) with a monoorganotriketoxime silane of the formula R′Si(ON=CX)$_3$ where R′ and X are defined above. The hydroxylated organosiloxane block copolymer would have the following composition. A polydiorganosiloxane block as defined in (A) is present in an amount of from 6.25 to 88.4 mol percent, the organosiloxane block defined in (B) is present in an amount of from 11.6 to 93.75 mol percent and the hydroxylated organosiloxane block coplymer has from 0.5 to 5 weight percent silicon-bonded hydroxyl radicals. The amount of monoorganotriketoxime silane reacted with the hydroxylated organosiloxane block copolymer is sufficient to provide from 2 to 27 mol percent based on the total number of siloxane units in the resulting product and sufficient enough to provide at least one molecule of monoorganotriketoxime silane per hydroxyl radical in the hydroxylated organosiloxane block copolymer.

The hydroxylated organosiloxane block copolymers suitable for use in the present invention are known in the art and can be prepared by a number of methods. Additional details for the preparation of the hydroxylated organosiloxane block copolymers can be found in U.S. Pats. No. 3,280,214, No. 3,294,718, No. 3,328,481 and No. 3,436,439 which are hereby incorporated by reference.

The room temperature vulcanizable compositions of the present invention are ketoxime functional organosiloxane block copolymers which are useful as arc resistant coatings and materials. The high arc resistance is obtainable upon exposure of the ketoxime functional organosiloxane block copolymer to moisture at room temperature. Prior art room temperature vulcanizable compositions do not usually have high arc resistance and the arc resistance is particularly low when such compositions are allowed to cure at room temperature. The arc resistance of some compositions can be increased by long post cures, however, this produces a brittle polymer.

The room temperature vulcanizable compositions of the present invention are also useful as dirt resistant coating compositions. The compositions of the present invention can be used to coat over silicone rubber to make the silicon rubber resistant to dirt pick up.

One preferred embodiment of the present invention is a ketoxime functional organosiloxane block copolymer consisting essentially of (A) 5 to 25 inclusive mol percent of diorganosiloxane units wherein the diorganosiloxane units are bonded through silicon-oxygen-silicon bonds forming a polydiorganosiloxane block having an average of from 6 to 15 inclusive diorganosiloxane units per block, said polydiorganosiloxane being at least 90 mol percent dimethylsiloxane units based on the total number of siloxane units in the polydiorganosiloxane and any remaining units being selected from the group consisting of phenylmethylsiloxane units and monomethylsiloxane units, (B) 50 to 75 inclusive mol percent organosiloxane units as described above and (C) 3 to 25 inclusive mol percent of the endblocking ketoxime siloxane units as described above, the mol percentages of (A), (B) and (C) being based on the total number of siloxane units in the organosiloxane block copolymer.

This preferred embodiment is particularly useful as a release coating for cooking utensils used in food preparation. The ketoxime functional organosiloxane block copolymer of the preferred embodiment cures at room temperature to a hard coating which readily releases food over extended use without a loss of release properties. This block copolymer can readily be used in solvent compositions which permit packaging in aersol containers, as can many of the other compositions of the present invention.

The room temperature vulcanizable compositions of the present invention are also useful as release coatings and for the preparation of air drying paints.

The following examples are presented for illustrative purposes only and should not be construed as limiting the present invention which is properly delineated in the claims. All of the processes of the preparative steps in the following examples are carried out under essentially anhydrous conditions unless otherwise stated.

EXAMPLE 1

A mixture of 500 g. of hydroxyl endblocked polydimethylsiloxane having an average of 34 dimethylsiloxane units per molecule, 1464.8 g. of toluene and 115.2 g. of CH$_2$=CHSi[ON=C(CH$_2$CH$_3$)(CH$_3$)]$_3$ was allowed to agitate slowly at room temperature for one hour. The resulting product solution contained

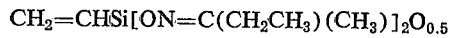

$$CH_2=CHSi[ON=C(CH_2CH_3)(CH_3)]_2O_{0.5}$$

endblocked polydimethylsiloxane. To this solution, a solution of 500 g. of a hydroxylated phenylsiloxane resin having 90 mol percent monophenylsiloxane units and 10 mol percent phenylmethylsiloxane units and having 6.4 weight percent silicon-bonded hydroxyl radicals and 392 g. of toluene was added. The resulting mixture was agitated slowly until a drop of the mixture, after being placed on a glass slide and evaporating the solvent, was compatible. The resulting compatible solution contained a hydroxylated organosiloxane block copolymer having a polydimethylsiloxane block and a resinous block of monophenylsiloxane units, monovinylsiloxane units and phenylmethylsiloxane units. The mole percentages of the siloxane units in the hydroxylated organosiloxane block copolymer, were 72.83 mol percent dimethylsiloxane units, 2.36 mol percent monovinylsiloxane units, 22.33 mol percent monophenylsiloxane units and 2.48 mol percent phenylmethylsiloxane units. To the solution of the hydroxylated organosiloxane block copolymer, 508 g. of $CH_2=CHSi[ON=C(CH_2CH_3)(CH_3)]_3$ was added with mild agitation. The resulting mixture was allowed to agitate for one hour at room temperature and then stripped at a reduced pressure of 10 mm. of Hg to a temperature of 100° C. The resulting residual product was a $$CH_2=CHSi[ON=C(CH_2CH_3)(CH_3)]_2O_{0.5}$$

endblocked organosiloxane block copolymer. This product was cured by exposing it to moisture at room temperature for seven days. The cured product was tested for arc resistance in accordance with the method described in ASTM-D-495. The cured product did not fail in 420 seconds, the maximum time for this test.

EXAMPLE 2

The procedure described in Example 1 was used to prepare a ketoxime functional organosiloxane block copolymer having $$CH_2=CHSi[ON=C(CH_2CH_3)(CH_3)]_2O_{0.5}$$

endblocking and the organosiloxane block copolymer consisting of 82.56 mol percent dimethylsiloxane units, 2.07 mol percent monovinylsiloxane units, 1.54 mol percent phenylmethylsiloxane units and 13.83 mol percent monophenylsiloxane units. The amounts of the ingredients were 650 g. of the hydroxyl endblocked polydimethylsiloxane, 1407.6 g. of toluene, 114.3 g. of $$CH_2=CHSi[ON=C(CH_2CH_3)(CH_3)]_3$$

a solution of 350 g. of the hydroxylated phenylsiloxane resin and 274 g. of toluene and the final addition of $CH_2=CHSi[ON=C(CH_2CH_3)(CH_3)]_3$ was 414.1 g. The arc resistance of the ketoxime function organosiloxane block copolymer was the same as determined in Example 1.

EXAMPLE 3

The vinyldi(methylethylketoxime)siloxy endblocked organosiloxane block copolymer of Example 1 was dispersed in toluene and 1,2-dimethoxyethane to provide a 40 weight percent solids with six weight percent of the solvent being 1,2-dimethoxyethane. A heat vulcanized sheet of silicone rubber was cleaned by rubbing the surface with a clean lint-free cloth soaked in toluene and then rinsed in toluene. The cleaned silicone rubber sheet was dipped into the dispersion and left for five minutes before removing at a rate of about 4 inches per minute. The sample was air dried for one hour providing a tack free surface which could be handled. The coating cured overnight to a 1 mil thickness. The coated silicone rubber did not pick up dirt when exposed to a dirty atmosphere.

EXAMPLE 4

A mixture of 590.0 g. of a hydroxyl endblocked polydimethylsiloxane having an average of 34 dimethylsiloxane unit per molecule and 1491.4 g. of toluene was prepared. To this mixture, 136.2 g. of vinyltri(methylethylketoxime) silane was added and the mixture was allowed to react for one hour at room temperature. To the resulting monovinyldi(methylethylketoxime)siloxy endblocked polydimethylsiloxane, 731.0 g. of a hydroxylated phenylsiloxane resin toluene solution was added. The toluene solution was 56.1 weight percent hydroxylated phenylsiloxane resin having 90 mol percent monophenylsiloxane units and 10 mol percent phenylmethylsiloxane units. The resulting mixture was heated to 65° C. for one hour and then cooled to room temperature. To the resulting hydroxylated organosiloxane block copolymer, 471.4 g. of vinyltri(methylethylketoxime) silane was added and the mixture was allowed to react for 15 minutes at room temperature before the volatiles were removed by stripping to 100° C. under reduced pressure to yield a monovinylidi(methylethylketoxime)siloxy endblocked organosiloxane block copolymer.

An aluminum panel was coated with a commercially available sealant based on polydimethylsiloxane and cured through a ketoxime crosslinking and allowed to cure at room temperature and was then coated over with a thin layer of the monovinyldi(methylethlketoxime)siloxy endblocked organosiloxane block copolymer. This coated panel was allowed to cure for 7 days at room temperature and then exposed to an outside industrial atmosphere. The gloss was determined by a glossometer at a 90° angle. The initial gloss was 90 and the gloss after six months exposure was 79. The coated panel was slightly dirty but cleaned easily with water.

EXAMPLE 5

(A) A mixture of 225 g. of a hydroxyl endblocked polydimethylsiloxane having an average of 34 dimethylsiloxane units per molecule, 361 g. of toluene and 1905 g. of water was added to a mixture of 380 g. of phenyltrichlorosilane, 38.2 g. of methylphenyldichlorosilane and 361 g. of toluene. The addition was over a period of 5 minutes during which time the temperature increased to 65° C. from room temperature. The mixture was then stirred for 30 minutes and thereafter the toluene phase and aqueous phase were separated, the toluene phase was washed with water and then with a 10 weight percent aqueous solution of sodium bicarbonate. The toluene phase was azeotroped dry. The resulting toluene phase contained 42 weight percent of a hydroxylated organosiloxane block copolymer having 0.69 weight percent silicon-bonded hydroxyl radicals.

To 238 g. of the above hydroxylated organosiloxane block copolymer in toluene, 12.25 g. of methyltri(methylethylketoxime)silane, 400 g. of xylene and 20 g. of chlorobenzene was added. The resulting mixture was refluxed for 3 hours. The resulting solvent mixture contained 67.8 weight percent of a monomethyldi(methylethylketoxime)siloxy endblocked organosiloxane block copolymer. The solvent was removed by heating to 100° C. under reduced pressure. The solventless product was then exposed to ambient air at room temperature for 7 days to give a cured product which had a tensile strength at break of 777 p.s.i., an elongation at break of 15%, a tear strength, Die B, of 200 p.p.i., and a durometer on the Shore A scale of 79.

(B) A mixture of 482 g. of the hydroxyl terminated polydimethylsiloxane as described in (A) above, 3316 g. of water and 712 g. of toluene was added to a mixture of 656 g. of phenyltrichlorosilane, 76.4 g. of methylphenyldichlorosilane and 712 g. of toluene over a 5 minute period with an increase in temperature from room temperature to 70° C. The toluene phase was recovered as described in (A) above and contained 41.9 weight percent of a hydroxylated organosiloxane block copolymer having 2.48 weight percent silicon-bonded hydroxyl radicals.

To 239 g. of this hydroxylated organosiloxane block copolymer in toluene, 42.15 g. of methyltri(methylethylketoxime)silane and 200 g. of xylene was added. The resulting mixture was refluxed for 3 hours. The product was 56.3 weight percent of a monomethyldi(methylethylketoxime)siloxy endblocked organosiloxane block copolymer in solvent. After removing the solvent by heating under reduced pressure to 100° C. and exposing the block copolymer to ambient air at room temperature for 7 days, the cured product had a tensile strength at break of 411 p.s.i., an elongation at break of 17%, a tear strength, Die B, of 60 p.p.i. and a durometer on the Shore A scale of 82.

EXAMPLE 6

(A) A ketoxime functional organosiloxane block copolymer was prepared by mixing 225 g. of a monomethyldiacetoxysiloxy terminated polydimethylsiloxane having an average of 34 dimethylsiloxane units per molecule and 1059 g. of a hydroxylated organosiloxane resin having 40 mol percent monophenylsiloxane units, 45 mol percent monomethylsiloxane units, 10 mol percent diphenylsiloxane units and 5 mol percent phenylmethylsiloxane units in 1927 g. of xylene. The monomethyldiacetoxysiloxy terminated polydimethylsiloxane was prepared by mixing methyltriacetoxysilane and hydroxyl terminated polydimethylsiloxane and allowing the mixture to react for one hour at room temperature. The xylene containing mixture described above was heated at 40° C. until the mixture was compatible as determined by placing 5 to 10 drops of the mixture on a glass slide and then heating at 100° C. until the solvent evaporated. Compatibility was reached when the solventless resin was clear. The resulting product was hydroxylated organosiloxane block copolymer having about 2 weight percent silicon-bonded hydroxyl radicals. After compatibility was reached 411 g. of methyltri(methylethylketoxime)silane was added and the mixture was heated at 40° C. for two hours. The resulting product was a monomethyldi(methylethylketoxime)siloxy endblocked organosiloxane block copolymer.

(B) A ketone functional organosiloxane block copolymer was prepared as described in (A) above, except as follows: 98.7 g. of a hydroxyl terminated polydimethylsiloxane having an average of 14 dimethylsiloxane units per molecule, 70.0 g. of $$CH_3Si[O-N=C(CH_3)(CH_2CH_3)]_3$$

was mixed and allowed to react for one hour at room temperature to produce a monomethyldi(methylethylketoxime)siloxy terminated polydimethylsiloxane. 706 g. of the hydroxylated organosiloxane resin in 706 g. of xylene was used and 483 g. of methyltri(methylethylketoxime)silane was used. A monomethyldi(methylethylketoxime)siloxy endblocked organosiloxane block copolymer was obtained.

Both ketoxime functional organosiloxane block copolymers of (A) and (B) were mixed with chloroethene to make a six weight percent solids. The mixtures were sprayed on pans and allowed to cure at room temperature for 24 hours. The pans readily released eggs, sausage and pizza sauce when burned on the pans.

EXAMPLE 7

When 24 mols of a hydroxyl endblocked polydiorganosiloxane having an average of 350 siloxane units per molecule and having 80 mol percent dimethylsiloxane units, 10 mol percent phenylmethylsiloxane units and 10 mol percent monomethylsiloxane units is mixed with 0.15 mol of monovinyltri(methylethylketoxime)silane and the mixture is allowed to agitate for one hour, a monovinyldi(methylethylketoxime)siloxy endblocked polydiorganosiloxane is obtained. To this product, 67.85 mols of an organosiloxane resin having 55 mols of monophenylsiloxane units, 5 mols of monopropylsiloxane units and 7.85 mols of methylnaphthylsiloxane units is added and the resulting mixture is agitated for one hour at 75° C. whereby a hydroxylated organosiloxane block copolymer is obtained. To the hydroxylated organosiloxane block copolymer, 8 mols of a mixture of ketoxime silanes is added and agitated for two hours at room temperature and then stripped to 100° C. at 10 mm. of Hg. The mixture of ketoxime silanes is composed of 5 mols of vinyltri(dimethylketoxime)silane and 3 mols of amyltri(methylphenylketoxime)silane. The resulting ketoxime functional organosiloxane block copolymer is an arc resistant product when used at room temperature by exposure to the atmosphere.

EXAMPLE 8

When 84 mols of a hydroxyl endblocked polydimethylsiloxane having an average of 50 dimethylsiloxane units per molecule is mixed with 3.36 mols of monoethyltriacetoxysilane and the mixture is allowed to agitate for one hour at 70° C., a monoethyldiacetoxysiloxy endblocked polydimethylsiloxane is obtained. To the product, 7.64 mols of hydroxylated monophenylsiloxane resin having 10 weight percent hydroxyl radicals is added and the mixture is agitated for 40 minutes at 85° C. whereby a hydroxylated organosiloxane block copolymer is obtained. To the hydroxylated organosiloxane block copolymer, 5 mols of

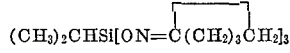

is added and the mixture is agitated for one hour at 40° C. and then stripped to 100° C. at 15 mm. of Hg to remove the volatiles. The resulting ketoxime functional organosiloxane block copolymer is a dirt resistant coating when cured by exposure to the atmosphere at room temperature.

EXAMPLE 9

When 30 mols of a hydroxyl endblocked polydiorganosiloxane having 98 mol percent dimethylsiloxane units and 2 mol percent phenylmethylsiloxane units and having an average of 15 diorganosiloxane units per molecule is mixed with 4 mols of monoxenyltrichlorosilane and agitated for 20 minutes at room temperature, a monoxenyldichlorosiloxy endblocked polydiorganosiloxane is obtained. To this product, 39 mols of a hydroxylated organosiloxane resin having 30 mols of monophenylsiloxane units and 9 mols of monotolylsiloxane units is added and the mixture is agitated for 4 hours at 120° C. whereby a hydroxylated organosiloxane block copolymer is obtained. To the hydroxylated organosiloxane block copolymer 27 mols of monomethyltri(ethylmethylketoxime)silane is added and the mixture is agitated at 80° C. for one hour and then stripped to 120° C. at 6 mm. of Hg. The resulting ketoxime functional organosiloxane block copolymer is an arc resistant product when cured by exposure to the atmosphere at room temperature.

EXAMPLE 10

When 48 mols of a hydroxyl endblocked polydimethylsiloxane having an average of 115 dimethylsiloxane units per molecule is mixed with 0.84 mol of monophenyltriacetoxysilane and agitated for 30 minutes at 60° C., a monophenyldiacetoxysiloxy endblocked polydimethylsiloxane is obtained. To this product, 49.16 mols of a hydroxylated organosiloxane resin having 40 mols of monophenylsiloxane units and 9.16 mols of monopropylsiloxane units is added and the mixture is agitated for one hour at 70° C. whereby a hydroxylated organosiloxane block copolymer is obtained. To the hydroxylated organosiloxane block copolymer, 2 mols of monophenyltri(ethylmethylketoxime)silane is added and the mixture is agitated for one hour at room temperature and then stripped to 115° C. at 20 mm. of Hg to provide a ketoxime functional organosiloxane block copolymer which is an arc resistant product when cured by exposure to the atmosphere at room temperature.

That which is claimed is:

1. A room temperature vulcanizable composition stable in the absence of moisture and curable upon exposure to moisture consisting essentially of a ketoxime functional organosiloxane block copolymer consisting essentially of (A) 5 to 84 inclusive mol percent of diorganosiloxane units wherein the diorganosiloxane units are bonded through siliconoxygen-silicon bonds forming a polydiorganosiloxane block having an average of from 6 to 350 inclusive diorganosiloxane units per block, said polydiorganosiloxane being at least 80 mol percent dimethylsiloxane units based on the total number of siloxane units in the polydiorganosiloxane and any remaining units being selected from the group consisting of phenylmethylsiloxane units and monomethylsiloxane units, (B) 11 to 75 inclusive mol percent organosiloxane units having an average formula $$R_xSiO_{\frac{4-x}{2}}$$

where $x$ has a value of from 1 to 1.3 inclusive and R is an organic group selected from the group consisting of aryl radicals, vinyl radicals, methyl radicals, ethyl radicals, and propyl radicals, said organic groups being at least 50 percent aryl radicals based on the total number of organic groups in (B), said organosiloxane units comprising a block of at least 3 organosiloxane units and said organosiloxane units being selected from monoorganosiloxane units and diorganosiloxane units, and (C) 2 to 27 inclusive mol percent of enblocking ketoxime siloxane units of the formula

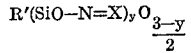

where $y$ has a average value from 1.8 to 2 inclusive, R' is an organic radical selected from the group consisting of alkyl radicals having from 1 to 5 inclusive carbon atoms, phenyl radicals and vinyl radicals and X is selected from the group consisting of radicals of the formula

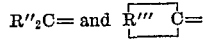

in which each R''' is selected from the group consisting of divalent hydrocarbon radicals and halogenated divalent hydrocarbon radicals and each R'' is a radical selected independently from the group consisting of monovalent hydrocarbon radicals and halogenated monovalent hydrocarbon radicals, the mol percentages of (A), (B) and (C) being based on the total number of siloxane units in the organosiloxane block copolymer.

2. The room temperature vulcanizable composition of claim 1 in which the diorganosiloxane units of (A) are present in an amount of from 60 to 80 inclusive mol percent, the organosiloxane units of (B) are present in an amount of from 14 to 26 inclusive mol percent and the enblocking ketoxime siloxane units of (C) are present in an amount of from 2 to 18 inclusive mol percent.

3. The room temperature vulcanizable composition of claim 1 in which all the diorganosiloxane units are dimethylsiloxane units, at least 80 percent of all the R radicals are aryl radicals and any remaining R radicals are methyl radicals and R' is a vinyl radical.

4. The room temperature vulcanizable composition of claim 2 in which all the diorganosiloxane units are dimethylsiloxane units, at least 80 percent of all the R radicals are aryl radicals and any remaining R radicals are methyl radicals and R' is a vinyl radical.

5. The room temperature vulcanizable composition of claim 3 in which there are from 25 to 100 dimethylsiloxane units per block in (A), the aryl radicals are phenyl, X is R''C= and each R'' is selected from the groups consisting of methyl and ethyl.

6. The room temperature vulcanizable composition of claim 4 in which there are from 25 to 100 dimethylsiloxane units per block in (A), the aryl radicals are phenyl, X is R''C= and each R is selected from the group consisting of methyl and ethyl.

7. The room temperature vulcanizable composition of claim 1 in which (A) is present in an amount of from 5 to 25 inclusive mol percent and there are 6 to 15 inclusive diorganosiloxane units per block and said polydiorganosiloxane block being at least 90 mol percent dimethylsiloxane units per block, (B) is present in an amount of from 50 to 75 inclusive mol percent and (C) is present in an amount of from 3 to 25 inclusive mol percent.

8. The room temperature vulcanizable composition of claim 7 in which all the diorganosiloxane units are dimethylsiloxane units.

References Cited

UNITED STATES PATENTS 3,184,427    5/1965    Russell et al. _____ 260—37
3,189,576    6/1965    Sweet _____ 260—465

DONALD E. CZAJA, Primary Examiner
M. I. MARQUIS, Assistant Examiner

U.S. Cl. X.R.

117—135.1; 252—63.7; 260—46.5